No. 725,518. PATENTED APR. 14, 1903.
J. WAHLBERG.
HOOK.
APPLICATION FILED AUG. 20, 1902.
NO MODEL.
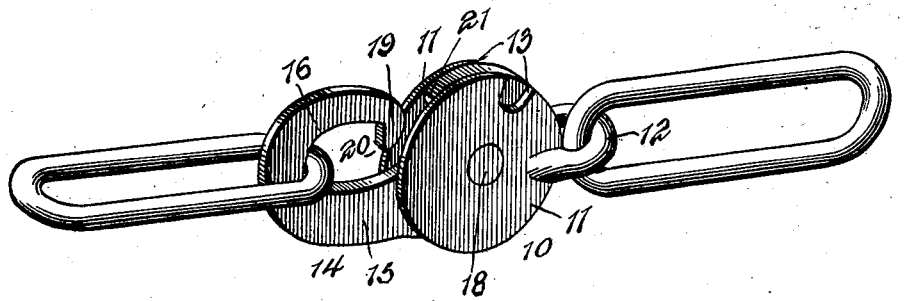
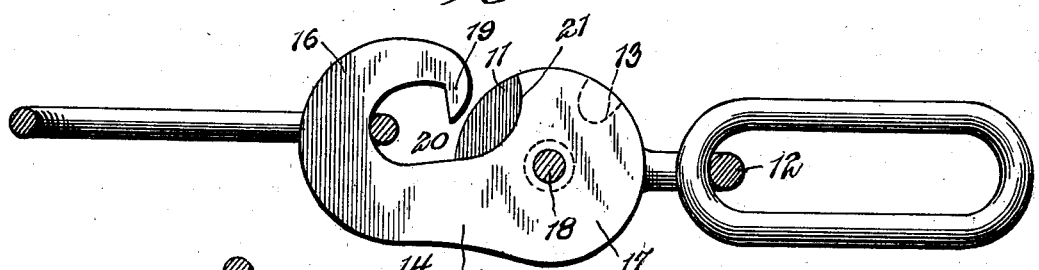
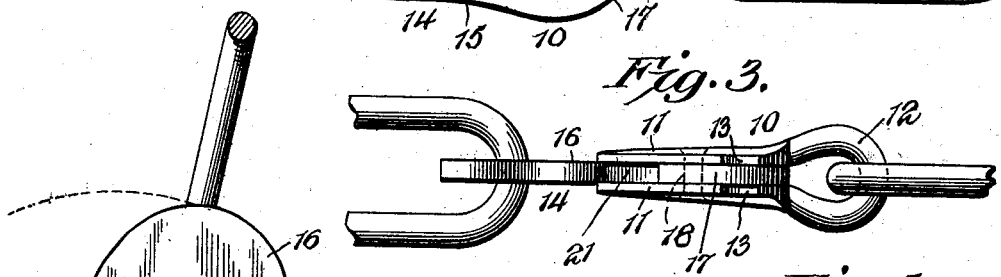
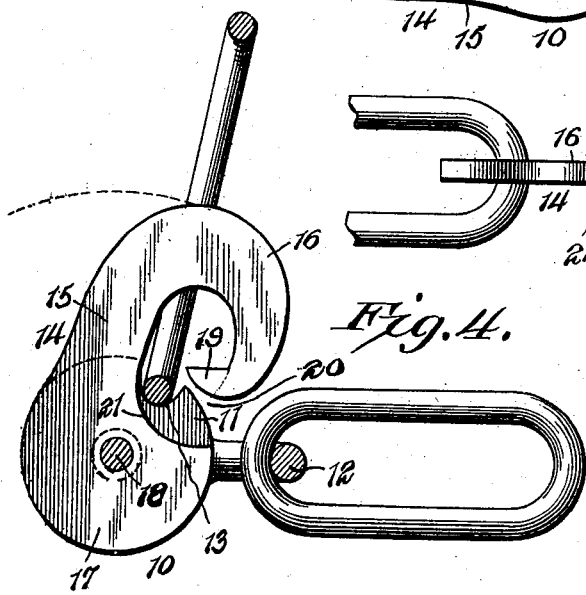
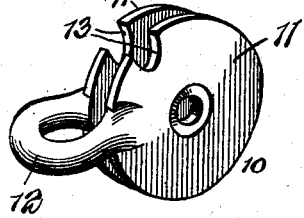
John Wahlberg, Inventor.
Witnesses
Howard D. Orr.
B. G. Foster.
By E. G. Siggers
Attorney ced face-plates having alined notches in their edges, of
UNITED STATES PATENT OFFICE.

JOHN WAHLBERG, OF EUREKA, CALIFORNIA.

HOOK.

SPECIFICATION forming part of Letters Patent No. 725,518, dated April 14, 1903.

Application filed August 20, 1902. Serial No. 120,403. (No model.)

*To all whom it may concern:*

Be it known that I, JOHN WAHLBERG, a citizen of the United States, residing at Eureka, in the county of Humboldt and State of California, have invented a new and useful Hook, of which the following is a specification.

This invention relates to improvements in lock-hooks; and the object thereof is to provide a hook that will hold a loop or ring against accidental disengagement, and yet permit its being readily taken off or placed on the same when desired.

The invention includes in its make-up a body having a ring-receiving seat, a hook pivoted to the body and movable over the seat, and one of the features of the invention resides in means for closing the seat when not in use, thus preventing straps or other articles becoming caught and entangled thereby and providing a smooth edge to the body.

The preferred embodiment of the invention is fully illustrated in the accompanying drawings, wherein—

Figure 1 is a perspective view of the hook, showing a link engaged thereon. Fig. 2 is a longitudinal sectional view through the same, one of the face-plates being removed. Fig. 3 is a top plan view of the hook. Fig. 4 is a view showing the manner of applying or removing the link, and Fig. 5 is a detail perspective view of the body.

Similar reference-numerals relate to similar parts throughout the several figures of the drawings.

In the embodiment shown a body 10 is employed comprising spaced face-plates 11, preferably in the form of disks connected by a loop 12 and having link or ring receiving sockets 13 in their edges, said sockets being in alinement. A hook 14 is associated with the body and comprises a shank 15, having a bill 16 at one end and a head 17 at the other, said head being in the form of a disk that is fitted between the face-plates 11 and is pivotally connected thereto by a suitable rivet 18. The head 17 is preferably equal in size to the face-plates, so that its peripheral edge is flush with the edges of said plates, and thus normally closes the seats or notches 13. The bill 16 of the hook is provided with an inturned nib 19, the inner end of which is spaced from the shank 15 a distance substantially equal to the width of the notches 13, forming an entrance-throat 20, which is arranged to aline with said notches when the hook is rotated in the proper direction, as clearly shown in Fig. 4. The head 17 of the hook is provided contiguous to the entrance-throat 20 with a cut-away portion 21, which alines with the notches 13 when the hook is moved to the position illustrated in Fig. 4, this cut-away portion extending beyond the outer side of the bill.

The manner of applying a link to the hook may be best described as follows: Said hook is rotated upon the body until the cut-away portion 21 alines with the notches. A link is then inserted in said notches, after which the movement of the hook is continued This brings the entrance-throat 20 into alinement with the notches, as shown in Fig. 4, whereupon the link may be drawn into engagement with the hook. A reverse movement is then given to the hook, whereupon the entrance-throat will be closed by the face-plates 11, projecting across the cut-out portion of the head. At the same time said head will close the notches. In this position the link is therefore locked within the hook and there is very little danger of said hook accidentally turning to the exact position necessary to the release of the link. There are particular advantages for this arrangement. In the first place, the structure is very simple, while the locking operation is secure, but, further than this, the ring-receiving seats or notches are normally closed, thus providing a smooth periphery for the body.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a hook of the class described, the combination with a body comprising spaced face-plates having alined notches in their edges, of means connecting the face-plates for attaching the body to a chain or other draft appliance, a hook having a head-disk rotatably mounted between the face-plates, said disk having its periphery coincident with the peripheries of the face-plates and normally extending across the space between the notches, the disk being also provided with a cut-out portion located contiguous to the hook and arranged to aline with said notches when the hook is in a position thereover.

2. In a device of the class described, the combination with a body comprising spaced face-plates or disks having alined notches in their edges and a loop at one side, of a hook having its bill provided with an inturned nib, and a head-disk carried by the hook and fitted between the face-plates, said head-disk normally closing the notches in the latter, and provided with a cut-away portion located opposite the inturned nib of the hook, said cut-away portion being brought into register with the notches in the face-plates.

I testimony that I claim the foregoing as my own I have hereto affixed my signature in the presence of two witnesses.

JOHN WAHLBERG.

Witnesses:
CHARLES A. MINER,
JUSTIN S. SOLOMON.